(12) United States Patent
Perahia et al.

(10) Patent No.: US 9,002,299 B2
(45) Date of Patent: Apr. 7, 2015

(54) MULTIPLE ANTENNA PROCESSING ON TRANSMIT FOR WIRELESS LOCAL AREA NETWORKS

(75) Inventors: Eldad Perahia, Sunnyvale, CA (US); Bretton Lee Douglas, San Jose, CA (US); Brian Hart, Milpitas, CA (US); Daniel Joseph Lyons, Chippewa Lake, OH (US)

(73) Assignee: Cisco Technology, Inc., San Jose, CA (US)

(*) Notice: Subject to any disclaimer, the term of this patent is extended or adjusted under 35 U.S.C. 154(b) by 1762 days.

(21) Appl. No.: 10/957,107

(22) Filed: Oct. 1, 2004

(65) Prior Publication Data

US 2006/0072524 A1 Apr. 6, 2006

(51) Int. Cl.
| | | |
|---|---|---|
| H04B 7/00 | (2006.01) | |
| H04L 25/03 | (2006.01) | |
| H04L 25/02 | (2006.01) | |
| H04B 7/06 | (2006.01) | |
| H04L 27/00 | (2006.01) | |

(52) U.S. Cl.
CPC ........ H04L 25/03343 (2013.01); H04L 25/022 (2013.01); H04B 7/0602 (2013.01); H04B 7/0615 (2013.01); H04L 25/0224 (2013.01); H04L 2027/0095 (2013.01)

(58) Field of Classification Search
USPC .............. 455/101, 67.11, 15.1; 370/334, 339
See application file for complete search history.

(56) References Cited

U.S. PATENT DOCUMENTS

| | | | |
|---|---|---|---|
| 5,345,599 A | 9/1994 | Paulraj et al. | 455/49.1 |
| 5,859,875 A | 1/1999 | Kato et al. | 375/267 |
| 5,949,793 A | 9/1999 | Bossard et al. | 370/487 |
| 6,005,876 A | 12/1999 | Cimini, Jr. et al. | 370/525 |
| 6,081,536 A | 6/2000 | Gorsuch et al. | 370/468 |
| 6,097,771 A | 8/2000 | Foschini | 375/346 |
| 6,131,016 A | 10/2000 | Greenstein et al. | 455/69 |
| 6,144,711 A | 11/2000 | Raleigh et al. | 375/347 |
| 6,173,005 B1 | 1/2001 | Kotzin et al. | 375/141 |
| 6,377,631 B1 | 4/2002 | Raleigh | 375/299 |
| 6,452,981 B1 | 9/2002 | Raleigh et al. | 375/299 |

(Continued)

OTHER PUBLICATIONS

Ban, K., Katayama, M., Stark, W.E., Yamazato, T., Ogawa, A.: "Convolutionally coded DS/CDMA system using multi-antenna transmission," 1997 IEEE Conference on Global Telecommunications, GLOBECOM '97., IEEE, Nov. 3-8, 1997, vol. 1, pp. 92-96.

(Continued)

*Primary Examiner* — Wen Huang

(57) ABSTRACT

A method and an apparatus in a first wireless station of a network transmitting to a second wireless station. The network uses multi-tone OFDM signals. The first station includes multiple antennas and a receive and a transmit signal path per antenna. Each receive signal path includes a discrete Fourier transformer determining the tones in a received signal, and each transmit signal path includes an inverse discrete Fourier transformer converting tones to a signal. The method includes determining channel estimates for each tone and each receive path while receiving from the second station, determining transmit weights to transmit to the second station, tone-by-tone weighting a signal for transmission to the second station to produce weighted tone sets for each transmit signal path, and transmitting the weighted tone sets. The first station is configured so that the weighting produces additive beamforming without the second station needing multiple antennas.

37 Claims, 6 Drawing Sheets

(56) References Cited

U.S. PATENT DOCUMENTS

| | | | |
|---|---|---|---|
| 6,487,253 B1* | 11/2002 | Jones et al. | 375/260 |
| 6,654,340 B1 | 11/2003 | Jones et al. | 370/208 |
| 6,668,161 B2* | 12/2003 | Boros et al. | 455/67.14 |
| 6,757,522 B1 | 6/2004 | Naegeli et al. | |
| 7,145,940 B2* | 12/2006 | Gore et al. | 375/147 |
| 7,200,171 B2* | 4/2007 | Forbes et al. | 375/224 |
| 7,212,798 B1 | 5/2007 | Adams et al. | 455/251.1 |
| 7,228,113 B1* | 6/2007 | Tang et al. | 455/101 |
| 7,299,021 B2* | 11/2007 | Parssinen et al. | 455/226.1 |
| 7,394,861 B1* | 7/2008 | Tang et al. | 375/267 |
| 7,453,946 B2* | 11/2008 | Sondur | 375/267 |
| 2002/0118724 A1* | 8/2002 | Kishimoto et al. | 375/132 |
| 2003/0123384 A1 | 7/2003 | Agee | 370/208 |
| 2003/0228850 A1* | 12/2003 | Hwang | 455/101 |
| 2004/0014443 A1* | 1/2004 | Nakao et al. | 455/130 |
| 2004/0042439 A1* | 3/2004 | Menon et al. | 370/343 |
| 2004/0072546 A1 | 4/2004 | Sugar et al. | 455/127.1 |
| 2004/0124995 A1 | 7/2004 | Treutler et al. | 340/870.07 |
| 2004/0178954 A1 | 9/2004 | Vook et al. | 342/383 |
| 2004/0185801 A1* | 9/2004 | Pauli et al. | 455/101 |
| 2004/0235433 A1* | 11/2004 | Hugl et al. | 455/101 |
| 2005/0041622 A1* | 2/2005 | Dubuc et al. | 370/332 |
| 2005/0075081 A1* | 4/2005 | Catreux-Erceg et al. | 455/78 |
| 2005/0195744 A1 | 9/2005 | Ryan et al. | 370/235 |
| 2005/0208897 A1 | 9/2005 | Lyons et al. | 455/67.11 |
| 2006/0014497 A1* | 1/2006 | Doi et al. | 455/67.11 |
| 2006/0029146 A1* | 2/2006 | Catreux et al. | 375/267 |

OTHER PUBLICATIONS

Koichiro Ban, Masaaki Katayama, Takaya Yamazato, Akira Ogawa: "A Simple Transmit/Receive Antenna Diversity for Indoor DS/CDMA Wireless Communication Systems," IEICE (The Institute of Electronics, Information and Communication Engineers) Transactions on Communications, vol. E80-B, No. 12(19971225) pp. 1790-1796.

Office action on Canadian Patent Application No. 2,583,111 mailed Apr. 18, 2012.

Extended Search Report on EPO Patent Application No. 05790027.6 mailed Feb. 7, 2013.

Wong et al: "Adaptive antennas at the mobile and base stations in an ofdm/tdma system", IEEE Transactions on Communications, vol. 49, No. 1, Jan. 1, 2001.

Matsuoka et al: "Comparison of pre-FFT and post-FFT processing adaptive arrays for OFDM systems in the presence of co-channel interference", personal, Indoor and Mobile Radio Communications, 2003. 14th IEEE Proceedings on Sep. 7-10, 2003, vol. 2, Sep. 7, 2003, pp. 1603-1607.

Bartolome et al: "MMSE techniques for space diversity receivers in OFDM-based wireless LANS", IEEE Journal on Selected Areas in Communications, vol. 21, No. 2, Feb. 1, 2003.

Leus et al: "Per-tone equalization for MIMO-OFDM systems", New Frontiers in Telecommunications : 2003 IEEE International Conference on Communications; May 11-15, 2003, vol. 4, May 11, 2003, pp. 2345-2349.

Wouters et al: "Real time prototyping of broadband wireless LAN systems", Rapid System Prototyping, 2004. Proceedings. 15th IEEE International Workshop on Geneva, Switzerland Jun. 28-30, 2004, Jun. 28, 2004, pp. 226-231.

Fujisawa et al: "A single-chip 802.11 a MAC/PHY with a 32-b RISC processor", IEEE Journal of Solid-State Circuits, vol. 38, No. 11, Nov. 1, 2003, pp. 2001-2009.

* cited by examiner $$H = \frac{1}{2} \underbrace{\left(H_{AP,D,Tx} \cdot H_{AP,RF,Tx,1} \cdot H_{C,Rx}\right)}_{601} \cdot \underbrace{\left(\frac{H^*_{C,Tx}}{|H_{C,Tx}|} \cdot \frac{H^*_{AP,D,Rx}}{|H_{AP,D,Rx}|} \cdot \frac{H^*_{AP,RF,Rx,1}}{|H_{AP,RF,Rx,1}|}\right)}_{602} \cdot \underbrace{\left(|H_1| + \frac{H^*_{AP,RF,Tx,2}}{H_{AP,RF,Tx,2}} \cdot \frac{|H_{AP,RF,Rx,2}|}{|H_{AP,RF,Rx,1}|} \cdot \frac{H^*_{AP,RF,Rx,1}}{H_{AP,RF,Rx,1}} \cdot |H_2|\right)}_{603}$$

FIG. 6

MULTIPLE ANTENNA PROCESSING ON TRANSMIT FOR WIRELESS LOCAL AREA NETWORKS

BACKGROUND

The present invention is related to wireless networks, and in particular to methods and apparatuses for transmitting using multiple antennas without requiring the receiver of the transmission to have multiple antennas.

Wireless networks, e.g., local area wireless networks (WLANs) conforming to the IEEE 802.11 standard have become common. It is known that the performance of a link in such a WLAN is significantly degraded in the presence of multipath, as in an office setting where there is no line-of-sight from the client to the access point. Some variants of the IEEE 802.11 standard use orthogonal frequency division multiplexing (OFDM), which is known to perform better than many alternatives in the presence of multipath.

WLANs often are used in an infrastructure wherein one wireless station of the network, called an access point, acts as a base station for a set of client stations. One mechanism for improving communication is to use multiple antennas at the access point and possibly at the client stations.

It is known, for example, to use antenna selection diversity at the access point wherein one of a plurality of receive antennas is selected according to a selection criterion, typically signal strength at the two receivers as measured by the received signal strength indication (RSSI) signal at the radio receiver. U.S. patent application Ser. No. 10/698,588 to Lyons et al. filed Oct. 31, 2003 titled ERROR VECTOR MAGNITUDE SELECTION DIVERSITY METRIC FOR OFDM, published as US 20050208897A, and now U.S. Pat. No. 6,922,549, introduced an alternate measure for antenna selection in an OFDM receiver based on an error vector magnitude (EVM) measure obtained at the receiver and measured from a preamble part of a packet as used in WLANs and received at the receiver.

It also is known to use beamforming at the access point, e.g., to use multiple radio receivers, one per receive antenna, and then combine the received signals from each antenna according to a combining method.

These methods significantly improve reception at the access point. Of course one can similarly improve reception at the client for transmissions by the access point by including multiple antennas at the client station. It would be beneficial, however, for the client to remain single antenna to maintain lower cost.

One known method of maintaining single antenna clients while having symmetry in the quality of reception at the access point (the uplink direction) and the quality of reception at the client (the downlink direction) is to include receive diversity at the access point for uplink improvement and transmit at higher power on the downlink. The higher transmit power, however, increases the likelihood of co-channel interference in an environment that includes several access points.

Thus there is a need in the art for methods of transmitting using multiple transmit antennas.

One known multiple antenna transmit solution includes changing which transmit antenna is used when a packet fails to be received at the client. This technique effectively involves transmit selection diversity at the media access control (MAC) level.

Thus there is still a need in the art for methods and apparatuses of transmitting using multiple transmit antennas.

There further is a need in the art for methods and apparatuses of transmitting using multiple transmit antennas that do not require the receiver, e.g., a single antenna client, to exchange knowledge related to calibration.

SUMMARY

Described herein is an apparatus to operate in a first wireless station, e.g., an AP of a wireless network, to transmit to a second wireless station, e.g., a client station of the AP. Also described herein is a method in the first wireless station for transmitting to the second station. The first and second stations are for communicating packets of information using OFDM signals that include a plurality of frequency tones, e.g., conforming to one of the OFDM variants of the IEEE 802.11 standard. The first station including a plurality of antennas, e.g., two antennas for receiving and transmitting coupled to a corresponding plurality of receive signal paths for receiving and to a corresponding plurality of transmit signal paths for transmitting.

One embodiment of the method includes determining the channel response for each receive signal path. Such channel response determining uses signals received at the first station corresponding to a part of a packet transmitted from the second station. That part of the packet has known values for a set of tones. The channel response determining includes performing a discrete Fourier transform to determine received tones corresponding to the part of the packet, and generating channel estimates for the receive signal paths for each tone whose value is known in the part of the packet.

The method also includes determining a set of transmit weights for each tone for each transmit signal path using the channel estimates, and tone-by-tone weighting a signal for transmission by the set of determined transmit weights to produce weighted tone sets for transmission via each transmit signal path.

The method also includes inverse discrete Fourier transforming the weighted tone sets to produce antenna signals for transmission via the transmit signal paths, and transmitting the set of antenna signals for transmission via each transmit signal path via the antennas.

The first station is configured such that the channel response at the receiving second station includes an additive contribution for transmissions via each transmitting antenna of the first station. The method is such that the second station can receive the signal for transmission without the second station requiring a plurality of receive antennas and without any first-station-specific calibration required at the second station.

In one embodiment, the transmit weight for each transmit signal path corresponding to each antenna has a phase angle which is the negative of the phase angle of the determined channel response for corresponding receive signal path connected to the same antenna.

In one implementation, each transmit signal path of the first station includes a transmit digital signal path whose output is coupled to a digital-to-analog converter whose output is coupled to a transmit RF signal path coupled to the antenna corresponding to the transmit signal path. Furthermore, each receive signal path of the first station includes a receive RF signal path coupled to the antenna corresponding to the receive signal path, and the output of each receive RF signal path is coupled to an analog-to-digital converter whose output is coupled to a receive digital signal path. The magnitude and phase response of the transmit digital signal path is substantially the same for each transmit signal path, and the magnitude and phase response of the receive digital signal path is substantially the same for each receive signal path. One aspect of the invention is configuring the first station such that the magnitude and phase response of each RF transmit signal path is substantially equal. Another aspect of the invention configuring the first station such that phase response of each RF transmit signal path is substantially equal.

In an alternate version, the transmit weights determining and the tone-by-tone weighting together include, for each tone, selecting one of the transmit signal paths for transmitting the signal for transmitting. The selecting is according to the determined channel response that has the largest magnitude, such that for each tone, the selecting is equivalent to weighting the signal for transmitting via the selected transmit signal path by one, and weighting the signal for transmitting via each other transmit signal path by zero.

BRIEF DESCRIPTION OF THE DRAWINGS

FIG. 1A shows the client transmitting and the access point receiving (the uplink), while FIG. 1B shows the access point transmitting and the client receiving (the downlink).

FIG. 6 shows some mathematical terms contributing to the overall channel response for a tone for one transmit beamforming embodiment.

DETAILED DESCRIPTION

Figure 1A:
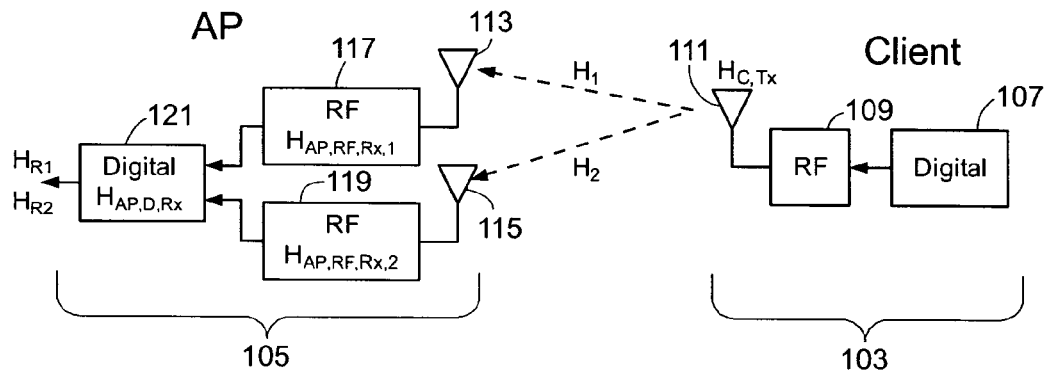
FIGS. 1A and 1B show a simplified WLAN that includes a client and an access point (AP) that implements an embodiment of the present invention.
Figure 1B:
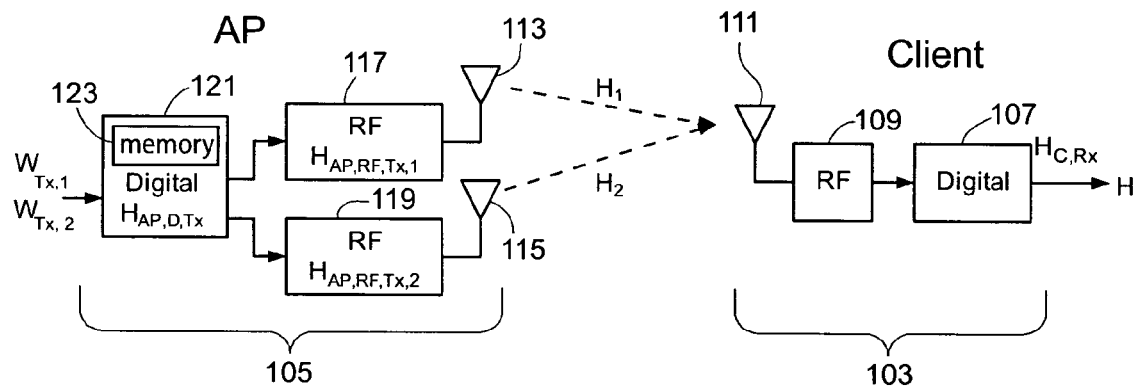

The present invention is described herein in the context of a WLAN that conforms to one of the OFDM variants of the IEEE 802.11 standard. FIGS. 1A and 1B show a simplified WLAN that includes a client 103 and an access point (AP) 105. FIG. 1A shows the client 103 transmitting and the access point 105 receiving (the uplink), while FIG. 1B shows the access point 105 transmitting and the client 103 receiving.

The client is shown in simple form as having a digital modem part 107 that for transmission accepts information from a MAC controller (not shown), and carries out digital modulation tasks according to the standard, including scrambling to form scrambled information, encoding to encode the information, puncturing, interleaving to form interleaved coded information, and modulating to form modulated OFDM tones, also called subcarriers. The modulated OFDM tones are subject to an inverse discrete Fourier transform (IDFT) operation and are cyclically extended to form the ODFM modulated digital signal to which a preamble is added to form the OFDM digital samples. The digital samples are converted to analog information via a digital-to-analog converter (DAC) to form the OFDM signal for transmission. The analog information is input to the transmitter RF part of an RF transceiver 109 coupled to an antenna 111. The RF signal is thus transmitted to the AP 105.

The multiple antenna aspects of the present invention are described herein using two antennas, and those in the art will understand that aspects of the invention may be extended to more than two antennas.

The access point 105 of FIGS. 1A and 1B includes two antennas 113 and 115. The description herein assumes the same antennas are used at the AP for transmit and receive. Referring still to FIG. 1A, the transmitted signal is received at each of the antennas 113 and 115 that are coupled to respective receiver parts of radio transceivers 117 and 119, respectively, via a duplexer, which in this time domain duplexing case, is a switch that connects to the receive or transmit parts depending on whether the AP is receiving or transmitting. The analog outputs of the transceivers are baseband, or close to baseband signals. In one embodiment, each receive chain of the transceivers 117 and 119 provides a single low-intermediate-frequency signal at the output for digitization by respective analog to digital converters. Alternate embodiments produce quadrature (I, Q) baseband signals for digitization.

The outputs of the transceiver are input to the receive part of a two-input receive part of a digital modem 121 that includes for each input an analog-to-digital converter (ADC), a downconverter including any filtering to produce baseband samples, an initial carrier frequency detector to determine timing, and a discrete Fourier transformer (DFT) to convert the samples to tones. One embodiment includes a channel estimator for each received signal that determines the channel experienced by each tone so far. The channel estimates are denoted $H_1(k)$ and $H_2(k)$ for the k'th tone, and first and second antenna paths via the first and second antennas 113 and 115, respectively, where $H_1(k)$ and $H_2(k)$ are complex valued quantities, e.g., have amplitude and phase in polar coordinates, and quadrature (I, Q) components in rectangular coordinates. One embodiment further includes a weight calculator that determines how to combine the tones using the estimated channels for each tone for each signal, and a beamformer that uses the calculated weights to form combined tones for further processing. The further processing includes pilot correction using known pilot subcarriers included with an OFDM signal according to the standard. The pilot corrected signals are then demodulated, and the demodulated signals are de-interleaved and de-punctured to form coded digital signals. The coded digital signals are decoded to produce the digital information for a MAC controller (not shown) for the AP.

Different criteria are used in different versions for calculating the beamforming weights in the receive part of the digital modem 121. In one embodiment, maximum ratio combining is used on a tone-by-tone basis. In another embodiment, for each tone, a "use one or the other antenna" decision is made to use the tone received from one antenna or the tone received from the other antenna based on comparing the channel response amplitudes for the particular tone for the two antennas. This is equivalent beamforming using weights of either 0 or 1 on a scale of 0 to 1 for each subcarrier.

Referring now to FIG. 1B, the access point includes a transmit part of the digital modem 121 that accepts digital information for transmission from the AP's MAC controller (not shown), and carries out digital modulation tasks according to the standard, including scrambling to form scrambled information, encoding to encode the information, puncturing and interleaving to form interleaved coded information, and modulating to form modulated OFDM tones. The modulated OFDM tones are now subjected to transmit beamforming according to weights denoted $W_{Tx,1}(k)$ and $W_{Tx,2}(k)$ for the k'th tone, for the first and second antennas 113 and 115, respectively, to form OFDM tones transmission by each of the antennas 113 and 115. Each set of OFDM tones is subject to a inverse discrete Fourier transform (IDFT) operation and are cyclically extended to form the OFDM modulated digital signal to which a preamble is added to form the OFDM digital samples for each antenna. The digital samples for each antenna are converted to analog information via digital-to-analog converters (DAC) to form the OFDM signals for transmission by each antenna. Each analog signal is input to a respective transmitter RF part of two RF transceivers 117 and 119 respectively coupled to each antenna 113 and 115. The RF signal is thus transmitted to the client 103.

The client receives the signal at its antenna 111 coupled to the transmit part of the transceiver 109. The received signal is converted to digital samples and processed in the receive part of the modem 107.

One aspect of the invention is that the client when receiving need not have multiple antennas to benefit from the transmit beamforming at the AP. Another aspect of the invention is that the beamforming is calibrated at the AP independent of the receive characteristics of the client 103.

In one embodiment, the weight calculator in the AP's digital modem 121 further uses the channel estimates determined by receiving from the client 103 to determine beamforming weights to use for beamforming when the AP 105 transmits to the same client 103. Thus, the digital modem 121 includes a memory 123 for storing the latest weight information, e.g., in the form of the latest channel response information, for a number, e.g., any associated clients plus any others such that the memory contains up to a predefined number of clients from which the AP most recently received information.

In one embodiment, for each tone, a "use one or the other antenna" decision is made to use one antenna or the other antenna for transmitting based on comparing the channel response amplitudes for the particular tone for the two antennas calculated from the most recently received packet from client 103. This is equivalent to using transmit weights of 0 or 1 in a range of 0 to 1. In another embodiment, a modified tone-by-tone maximum ratio combining criterion is used based on the channel responses for the particular tone for the two antennas calculated from the most recently received packet from client 103.

The embodiments described in FIGS. 1A and 1B require a radio receiver, including much of the receive part of the digital modem for each receive antenna for uplink communication, and a radio transmitter, including a section of the transmit path of the digital modem for each transmit antenna.

A much more economical approach is to have a single transceiver that for uplink communication can alternately connect to each of the two antennas during the start of the packet and select the antenna based on some decision metric. This approach is referred to as selection diversity.

Figure 2A:
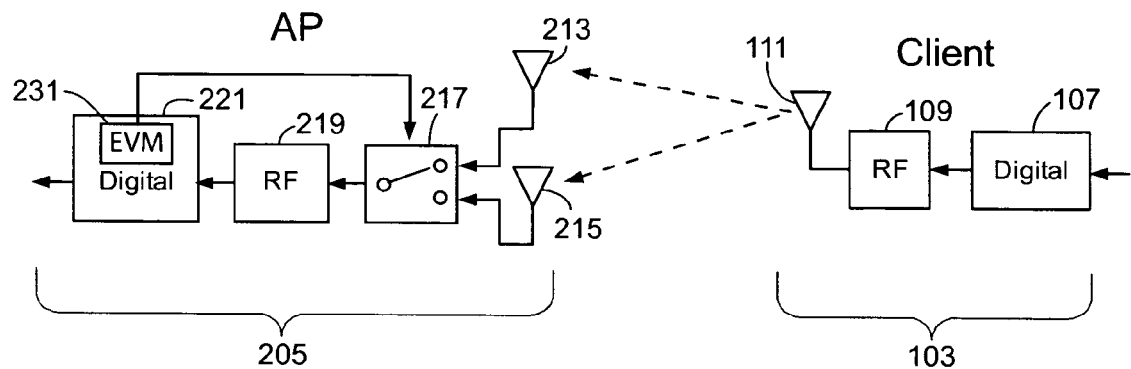
FIGS. 2A and 2B show a simplified WLAN that includes a client and an access point that implements an alternate embodiment using selection diversity, so it does not require the same amount of electronics at the AP as in the AP shown in FIGS. 1A and 1B.
Figure 2B:
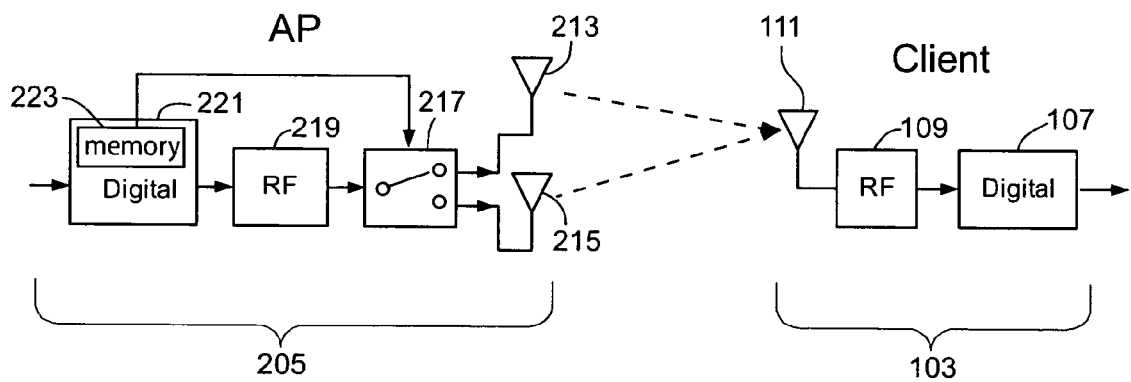

FIGS. 2A and 2B show a simplified WLAN that includes a client and an access point that implements an alternate embodiment using selection diversity, so it does not require the same amount of electronics at the AP 205 as in the access point 105, and thus is a lower cost solution than that described above with reference to FIGS. 1A and 1B. In particular, the access point 205 includes a first antenna 213 and a second antenna 215, both coupled to an antenna selector 217 that selects either antenna 213 or antenna 215. The selector is coupled to both the receive and transmit parts of a transceiver 219 via a duplexer that is a switch in this embodiment. The transceiver is coupled to a digital modem 221.

On the uplink, referring to FIG. 2A, the AP duplexer—a switch—connects the output of the antenna selector to the receive part of the RF radio 219. A signal is transmitted by the client as described above and is received at both antennas. Prior art selection diversity receivers select the antenna to use for reception based on such measures as the RSSI. In one embodiment, the access point operates as described in above-mentioned incorporated-by-reference U.S. patent application Ser. No. 10/698,588 titled ERROR VECTOR MAGNITUDE SELECTION DIVERSITY METRIC FOR OFDM. A packet conforming to the OFDM variants of the IEEE 802.11 standard includes a preamble and a modulated part. The receive part of the modem 221 includes an EVM calculator 231 that calculates an error vector magnitude (EVM) measure from a preamble part of a packet during reception of the preamble. During such reception, the EVM measure is obtained via the first antenna 213 then via the second antenna 215. In one embodiment, the EVM measure is obtained prior to automatic gain control (AGC) so that AGC is performed on the antenna receiving the remainder of the packet. The EVM calculator 231 calculates a measure of the pre-AGC EVMs of the signals received via antenna 213 and 215, compares the calculated EVMs, and outputs an antenna select signal according to the superior metric. Thus, the EVM calculator 231 selects via a connection between the modem 221 and the selector 217 the antenna that gives the best EVM measure. The selector now connects such antenna to the receive chain, and the remainder of the packet is received via the selected antenna. The receive paths of the RF receiver 219 and digital modem 221 thus receive and demodulate/decode the remainder of the packet. Note that other than the selctor, EVM calculator, and associated control, only a single receive path is required. Thus, for receiving, the access point 205 is less expensive to manufacture than one such as AP 105.

FIG. 2B shows a simplified diagram of the downlink communication from the AP 205 to the same client station 103. A memory 223 stores the results of comparing the EVM measure from both antennas when receiving from the client 103. The memory 223 stores EVM-based decisions for a number of recently communicated—with client stations, e.g., the client stations associated with the AP. The information in memory 223 for the client station 103 is used to control the antenna selector 217 to select one of the antennas 213, 215 for transmitting to the client station 103. Once the antenna for transmitting is selected, the packet for transmission is encoded and modulated, then OFDM signal samples are generated. The OFDM signal samples are converted to analog signals and transmitted as RF via the transmit part of the transceiver 219 and the selected transmit antenna.

Thus selecting the transmit antenna is an improvement over prior art RSSI-based selection criteria.

Compared to the transmitting shown in FIG. 1B, the transmitting described in FIG. 2B does not require two RF transmit paths in the transceiver, nor two IDFT operations in the transmit part of the modem. Thus, for transmitting to the access point, 205 is less expensive to manufacture than one such as AP 105.

Figure 3A:
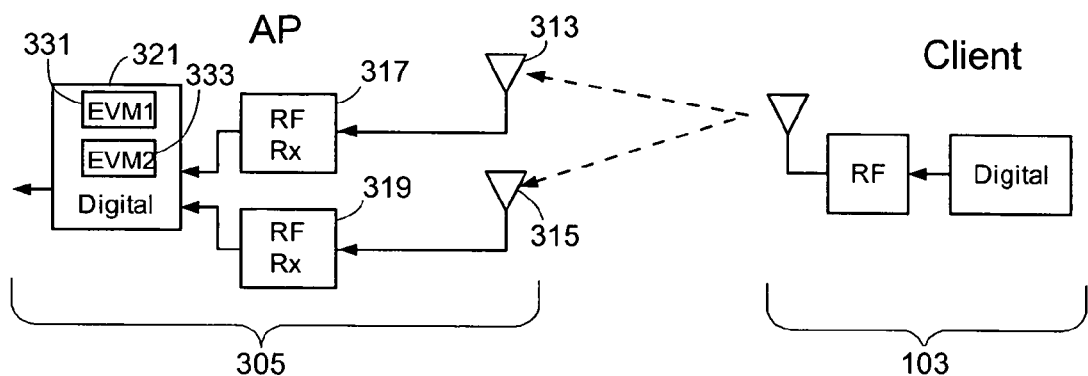
FIGS. 3A and 3B show a simplified WLAN that includes a client and an access point that implements another alternate embodiment using selection diversity on the downlink.
Figure 3B:
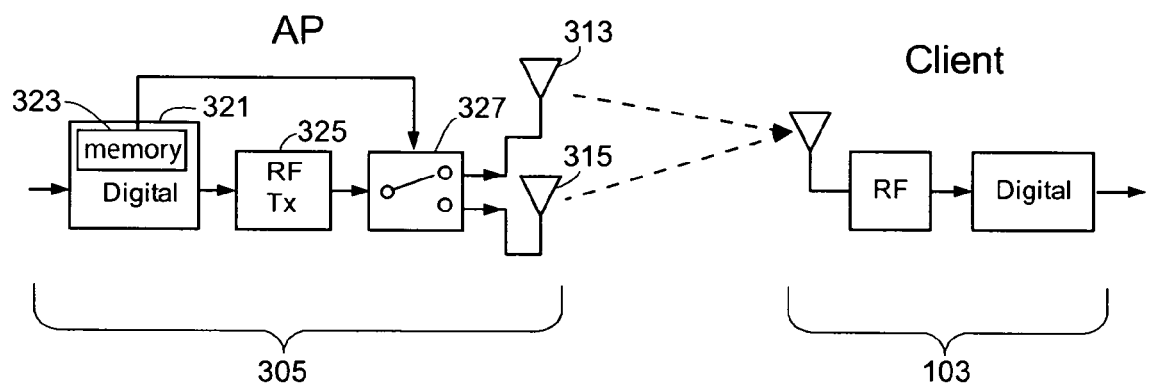

FIGS. 3A and 3B show the uplink and downlink communications of another alternate embodiment. An AP 305 communicating with the client 103 includes a transceiver that has two RF receive paths, shown as RF receivers 317 and 319 coupled to a first antenna 313 and a second antenna 315, but a single transmit path including an RF radio transmitter 325. The RF receivers and the RF transmitter are coupled to a digital modem 321. Referring to FIG. 3A, for uplink communication, the receive part of the digital modem 321 includes two paths that each includes an EVM calculator for each antenna signal, shown as EVM1 331 and EVM2 333 that each calculate a measure of the EVM based not on the preamble, but rather on demodulated symbols of tones of the OFDM signals from each antenna and respective RF receiver. In one embodiment, the EVM calculation is as described in U.S.

patent application Ser. No. 10/367,010 to Ryan et al., filed Feb. 14, 2003 and titled SELECTING THE DATA RATE OF A WIRELESS NETWORK LINK ACCORDING TO A MEASURE OF ERROR VECTOR MAGNITUDE, published as US 20050195744A, now U.S. Pat. No. 6,898,198. U.S. patent application Ser. No. 10/367,010 is incorporated herein by reference. A packet conforming to the OFDM variants of the IEEE 802.11 standard includes a low-rate coded field called the SIGNAL field that describes how the remainder of the packet is encoded, e.g., the data rate and modulation. U.S. patent application Ser. No. 10/367,010 describes how the EVM of the SIGNAL field can be used to select the data rate for communication with a particular station. In the case of the system of FIG. 3A, the EVM is used to determine the data rate for communicating with the client 103. One embodiment of the receive part of the digital modem further includes a beamforming weight calculator as described with reference to FIG. 1A.

One aspect of the invention is that for transmitting to a client station, the EVM measures of signals received from the client through each antenna are compared and are used for downlink comunication with that client. Referring now to FIG. 3B, one embodiment of the digital modem 321 has a transmit section that is similar to that shown in FIG. 2B, in that the modem 321 includes a memory 323 maintaining the EVMs, or decisions based thereon, for communicating with recently communicated with, e.g., associated client stations. The transmit part path of the access point 305 includes a transmit antenna selector 307 coupled to the memory that selects the transmit antenna according to the stored EVM measures, or decisions therefrom. The modem includes only a single transmit signal path, and the RF section includes only a single RF transmitter 325 between the to-be-transmitted signal output of the digital modem and the antenna selector 327.

Note that using a single signal path for transmit is useful, even in the case that two receive paths are used for receiving, e.g., as shown in FIGS. 3A and 3B, because a RF transmit path includes a transmit power amplifier, so saving one RF transmit path is worthwhile.

Figure 4:
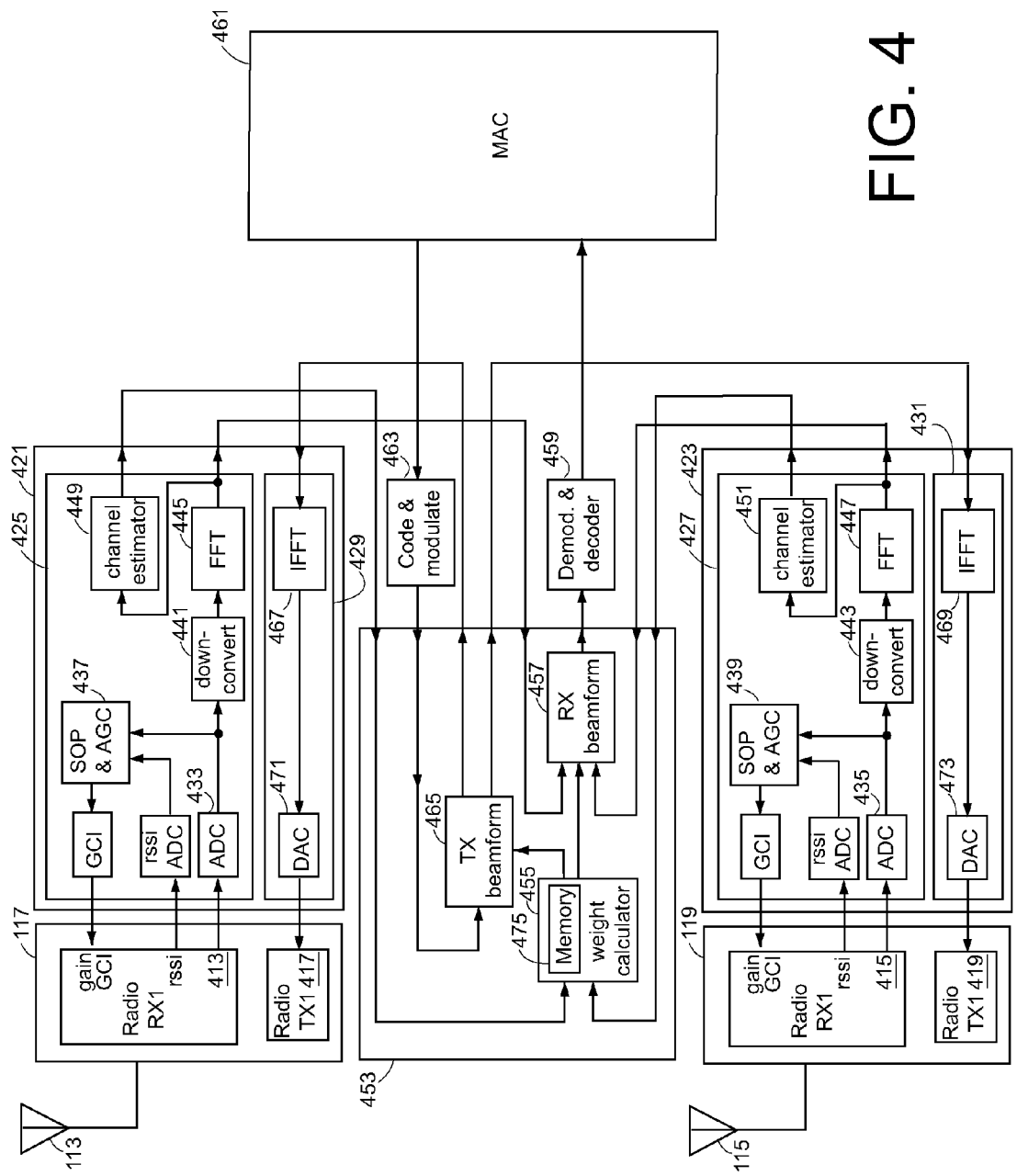
FIG. 4 is a simplified block diagram of a complete access point embodiment shown in more detail than the block diagrams of FIGS. 1A and 1B.

FIG. 4 is a block diagram of a complete access point such as AP 105 shown in more detail than the block diagrams of FIGS. 1A and 1B. The access point includes a first antenna 113 and a second antenna 115 coupled via a duplexing switch (not shown) to a first radio transceiver 117 and a second radio transceiver 119. The first and second radio transceivers 117, 119 include a radio receiver 413, 415, respectively, and a radio transmitter 417, 419, respectively. The first and second radio transceivers are coupled to respective digital circuits 421 and 423. Each digital circuit 421, 423 respectively includes a receive digital path 425, 427 and a transmit digital path 429, 431. Each receive digital path 425, 427 accepts low IF signals from the respective radio receiver 413, 415 and digitizes the signals using a respective ADC 433, 435. The digital samples from the respective ADC 433, 435 are accepted by a respective start of packet (SOP) and automatic gain control (AGC) subsystem 437, 439. The respective radio receiver 413, 415 also provides a RSSI signal to the respective digital receive paths 425, 427, and the RSSI signal from the respective radio receiver 413, 415 is digitized by a respective RSSI ADC to provide RSSI signal samples to the respective SOP and AGC subsystem 437, 439. Each respective SOP and AGC subsystem 437, 439 determines the start of packet, and also sets the gains of each radio receiver 413, 415 via a gain control interface (GCI).

The digital samples from each respective ADC 433, 435 are downconverted to produce baseband samples using a downconverter 441, 443 in each digital receive path 425, 427. The downconverted signals are converted to modulated tones by a fast Fourier transform (FFT) unit 445, 447. Each packet conforming to an OFDM variant of the IEEE 802.11 standard includes symbols of known subcarriers in the preamble. Each digital receive path 425, 427 includes a channel estimator 449, 451 accepting the output of the respective FFT unit 445, 447 during reception of the known symbols and determines the channel response for each tone for each antenna's receive path so far.

The access point also includes a beamforming subsystem 453 that for reception includes a weight calculator 455 that accepts the respective outputs of the channel estimators 449, 451 for each antennas' receiver. The weight calculator in one embodiment calculates complex valued receive weights that are accepted by a receive beamformer 457. The receive beamformer 457 accepts the outputs of the respective FFT units 445, 447 and forms a weighted signal for demodulation and decoding. A demodulator (demod.) and decoder subsystem 459 carries out the demodulation, de-interleaving, de-puncturing and de-scrambling to form the digital data for a received packet. The output of the demodulator and decoder subsystem 459 is accepted by a MAC processor 461.

Not shown in FIG. 4 are the timing and synchronizing units that determine the timing, e.g., for the FFT units 445, 447. In one embodiment, one of the digital receive paths, e.g., digital receive path 425 acts as a master to the second digital receive chain 427 in that the timing in the two digital receive paths are synchronized, with the digital receive path 425 determining the timing for both.

One embodiment of the weight calculator 455 uses a maximum ratio combining method to determine complex valued weights for the receive beamformer 457 as described further below.

Another embodiment of the combination of the weight calculator and beamformer examines the magnitude of the channel responses for the first and second receive paths, and for each tone, selects the antenna path that has the greater magnitude channel response. Thus, the demodulator and decoder subsystem accepts for each tone the signal for demodulation from the receive path system that provided the "better" channel in terms of channel response magnitude. At any time, for any subcarrier either one or the other antenna's signal is used for demodulation and decoding. This is equivalent to using real-valued weights of 0 or 1 on a scale of 0 to 1.

On the downlink, information from the MAC is accepted by a coder and modulator 463 that scrambles and encodes the data, punctures and interleaves the coded data, and modulates the data to form modulated symbols for each tone of a to-be-transmitted OFDM signal. Pilot tones are combined to form a complete set of tones. The complete set of tones are accepted by a transmit beamformer 465 that also accepts transmit weights from the weight calculator 455 to generate two tone-sets, one for each transmit-chain to be transmitted by each of antennas 113 and 115. The weights are from a memory 475, shown here as in the weight calculator, and in general is coupled to the weight calculator.

One embodiment of transmit beamforming in the transmit beamformer accepts complex valued transmit weights according to a modified maximum ratio combining criterion. Such weights are obtained from the channel responses of the last received packet. Another embodiment transmits each tone either via the first or the second antenna depending on a comparison of the amplitude of the respective channel responses. This is equivalent to transmit beamforming using real valued transmit weights of either 0 or 1 on a scale of 0 to 1, although the implementation does not use such weighting but rather a binary decision branch. How the transmit weights are calculated and other implementation aspects are described in more detail below.

The two tone-sets from the transmit beamformer 465 are input to the first and second digital transmit paths 429, 431. Each digital transmit path 429, 431 includes a respective inverse FFT (IFFT) unit 467, 469 to convert the tone sets to time-domain to-be-transmitted digital signals. Each digital transmit path 429, 431 includes a mechanism (not shown in this drawing) to add cyclic extension to the data corresponding to each OFDM signal and a mechanism, also not shown in FIG. 4 to form a respective packet by adding a preamble to the respective data. The complete digital data for each packet is converted to analog data by a respective DAC 471, 473 to generated I,Q data for the respective radio transmitter 417, 419.

The respective radio transmitter 417, 419 transmits the packet via the first antenna 113 and second antenna 115, respectively. Not shown in FIG. 4 is the duplexer—a switch—for switching each of the antennas between the respective radio transmitter and the respective radio receiver.

Figure 5:
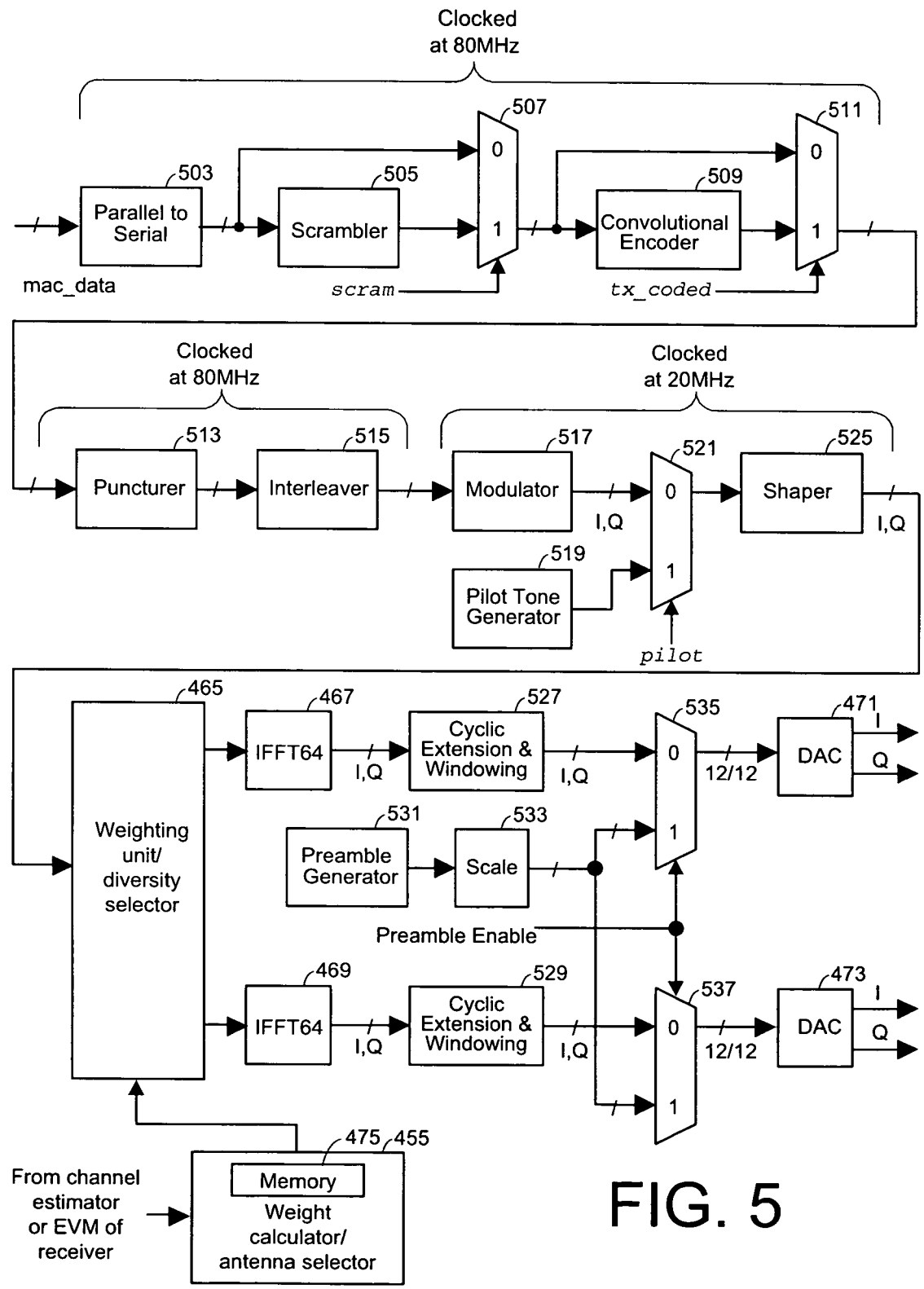
FIG. 5 is a simplified block diagram illustrating in more detail than shown in FIG. 4 one embodiment of the coding and modulation unit, and of the post transmit beamformer processing.

FIG. 5 is a block diagram illustrating in more detail than shown in FIG. 4 one embodiment of the coding and modulation unit 463, and of the post transmit beamformer processing. The data from the MAC processor 461, labeled mac_ data, is in parallel form and is converted to a serial stream by a parallel-to-serial converter 503. A scrambler 505 accepts and scrambles the data. A selector 507 selects the scrambled data or the unscrambled version according to a signal labeled scram. Assume scrambled data is output by selector 507. A convolutional encoder 509 encodes the data. A selector 511 selects the coded data or the uncoded version according to a signal labeled tx_coded. Assume coded data is output by the selector 511. The coded data is punctured by a puncturer 513 and interleaved by an interleaver 515 to produce the interleaved data for modulation. A modulator 517 modulates the data to generate modulated symbols for each tone. Some of the tones are pilot tones, and a selector 521 selects whether the tone is a modulated symbol from the modulator 517 or a pilot tone from an included pilot tone generator 519 that generated pilot tones. The tones are shaped by a shaper 525 to produce the tones for multiplexing and transmission.

Note that some of the units in the coder and modulator 463 operate according to the data rate. Furthermore, the SIGNAL field specifying the data rate and modulated with BPSK is first generated.

In one embodiment, the modulated signals are weighted by a weighting unit 465 that accepts transmit weights from the memory 475, shown as part of the weight calculator 455. The output of the weight generator is the two weighted tone symbols that are respectively input into IFFT units 467 and 469 for multiplexing into OFDM signal samples for transmission.

In another embodiment, the unit 465 implements tone-by-tone diversity selection according to a comparison of the magnitude of the estimated channel response for each tone via each of the antenna paths. In one version, the unit 455 is thus an antenna selector to select an antenna tone-by-tone. Unit 465 thus switches the output of the coder and modulator 463, e.g., the output of the shaper 525, between the input of the IFFT unit 467 and the input of IFFT unit 469. This, as described above, is equivalent to weighting by real-valued binary valued weights of 0 or 1 on a scale of 0 to 1. Therefore, the output of unit 465 may be called the weighted outputs in either the tone-by-tone diversity or tone-by-tone weighting embodiments.

The IFFT units 467, 469 produce the OFDM signals and are accepted by cyclic extension and windowing units 527, 529 to add a cyclic extension and window each symbol. A preamble generator 531 produces the preamble for each packet, and has an output that is scaled by a scaler 533. For each transmit path, a respective selector 535, 537 initially selects the scaled preamble generated by the preamble generator 531 and the scaler 533 according to a signal called Preamble Enable. The Preamble Enable switches the respective selector 535, 537 to accept the cyclically extended OFDM signals to produce I,Q samples for conversion to analog I,Q signals by respective DAC 471, 473 for transmission by the antenna 113, 115, respectively.

EVM-Based Selection Diversity Transmission

As described above with reference to FIGS. 2A and 2B, one embodiment includes selecting the antenna according to a measure of the EVM of a preamble part received via both antennas.

By "a measure of the relative EVM" in general is meant any measure that varies monotonically with an approximation of the EVM, e.g., with an approximation of the measure of the RMS distance between received symbols and ideal symbols, divided by the RMS distance from ideal symbols to zero. Note that in this description, the averaging is carried out after division. In alternate embodiments, the averaging is carried out prior to division. As will be shown later, several methods are presented for determining a measure of the relative EVM, e.g., as an approximation to the relative EVM.

The most accurate EVM estimate would require demodulating the packet and computing the EVM directly by comparing the measured symbol positions to the ideal symbol positions. In the embodiment of FIG. 2A, the EVM unit 231 measures and compares a measure of the EVM and carries out antenna diversity selection prior to AGC so that the gain can afterwards be set appropriately for the selected antenna by the AGC method. In one embodiment, AGC also takes place before the end of the short preamble part to allow enough time for other necessary radio functions to occur. In one embodiment, the AGC method is as described in U.S. patent application Ser. No. 10/622,175 to Adams et al. filed Jul. 17, 2003, titled ADAPTIVE AGC IN A WIRELESS NETWORK RECEIVER, now U.S. Pat. No. 7,212,798, and includes setting the gains in a set of stages. When antenna diversity selection is included, selecting the antenna from a set of antennas replaces the first AGC stage, and occurs during the short preamble period and while the gains are set to a default gain level. One embodiment of the selection method takes place over two short sequence times, one short sequence period per antenna, after SOP detection.

The antenna selection also is carried out prior to initial timing estimation that determines the timing of the short symbols. Thus, at this early stage in the short preamble period, the inventors chose to use an EVM calculator that approximates the EVM without requiring that the short symbol timing be determined and without demodulating. Of course alternate embodiments may use different methods for calculating the EVM (see FIG. 3A).

In calculating a measure approximating the EVM without requiring accurate timing, an assumption is made that the EVM is due only to noise or colored interference; other EVM contributors are neglected. Of course, the method operates even if such other sources of error exist. The EVM calculator is simply less accurate under such conditions. Experiments demonstrated, however, that the antenna selection method works reasonably well even with this approximate measure of the EVM.

Under this assumption, in one embodiment, an approximate measure of the relative EVM is determined by determining the symbol vector magnitude (SVM) during the short sequences and the noise power per subcarrier prior to the short sequences.

Note that in practice, noise samples from only one of the two antennas are taken.

According to the IEEE 802.11 standard, only 12 out of the 52 subcarriers are used in the short sequences. In one embodiment, the SVMs for each antenna, e.g., antenna 1 are determined by gathering one-short symbol's worth of consecutive samples, i.e., 16 consecutive short sequence samples when sampling at 20 MHz, from antenna 1, $x_1[i]$ for $0 \leq i \leq 15$, and performing a discrete Fourier transform (DFT) on these samples. Specifically, in one embodiment, the symbol vector magnitudes per subcarrier are estimated by $$SVM_1[k] = \sqrt{\frac{3}{13}} \frac{1}{16} \left| \sum_{i=0}^{15} x_1[i] \exp\left(\frac{-j2\pi k i}{16}\right) \right|, \quad \text{Eq. 1}$$

for k=1, 2, 3, 4, 5, 6, 10, 11, 12, 13, 14, and 15. Only these twelve SVMs can be estimated during the short sequences because only 12 out of the 52 subcarriers are used in the short sequences. As a consequence of only 12 subcarriers being used in the short sequences, these 12 subcarriers have 13/3 times the power of the packet subcarriers to maintain constant signal power between the short sequences and the remainder of the packet when all 52 subcarriers are used. The factor $\sqrt{3/13}$ in the above equation is used to adjust between the difference in the short sequence subcarrier power and packet subcarrier power. This is because the SVMs are assumed to be equal to the square root of the packet subcarrier powers.

The next step in calculating the relative EVM is to determine the subcarrier noise power. In one embodiment, it is assumed measurements from a first antenna—denoted antenna 1 here—is available.

In a first variation, the determination of a measure of the relative EVM does not require a determination of the noise, in the sense that an assumption is made that the noise is additive white noise and the same noise power appears at each receive antenna, i.e., that the noise is the same for each subcarrier and for each antenna. Thus, according to the first variation, the selection is made according to a measure:

$$\text{Relative } EVM_m = \sum_k \frac{1}{SVM_m[k]}, \quad \text{Eq. 1}$$

where m=1 or 2, indicating the first or second antenna. This variation has an advantage that it is easy to implement. For example, a lot of the scale factors, e.g., sqrt(3/13), and many of the terms for the noise power become unimportant.

Another variation uses an estimate of the power spectral density of the noise from antenna 1, as well as a power spectral density of the signal. Thus, one implementation of this method includes:

(a) Determining a 16 point-FFT on the baseband noise in antenna 1 sometime before the start of packet while the receiver is set to its default gain settings. This provides a measure of the power spectral density of the noise. It is assumed that the power spectral density of the noise from antenna 1 applies also to antenna 2.

(b) Determining a 16 point FFT on the known second short symbol to determine a measure of the power spectral density of the signal using the 12 short symbol subcarriers.

(c) Assuming an upper bound on the baseband SNR, the post AGC subcarrier to noise ratio (SCNR) is estimated for each of the 12 short symbol subcarriers.

(d) Computing the relative EVM.

(e) Selecting the receive antenna with the lowest estimated error.

Furthermore, in the above-described embodiments, the relative. EVM determinations, according to any of the variations, occur pre-AGC. In yet another set of variations, the determining of the measure of the relative EVM occur with signals post-AGC. For example, this may occur by carrying out AGC on a first antenna, obtaining the information needed to determine a measure of the relative EVM on the first antenna, carrying out AGC on the other, second antenna, then obtaining the information needed to determine a measure of the relative EVM on the second antenna. With this set of variations, the relative EVMs of the two antennas are obtained post-AGC, and compared to select the one antenna or the other.

The Receive Weight Calculation Method

The receive weight calculation carried out by one embodiment of weight calculator 475 is now described. The weight calculator 475 processes data after the FFT. Therefore the subsequent notation is complex-valued and in the frequency domain, e.g., for each tone, whether or not the tone dependency is explicitly shown. Denote the tones of a transmitted data stream by Z(k), where k=−26, −25, −24, . . . , −1, 1, . . . , 25. 26 denote the 52 frequency tones according to The OFDM variants of the IEEE 802.11 standard. Suppose in general there are L antennas. L=2 in the above drawings. Denote by $Y_1(k), \ldots, Y_L(k)$ the received signals on branch 1, . . . L, respectively. Denote by $H_1(k), \ldots, H_L(k)$ the channel experienced by tone k for receive paths 1 through L corresponding to antennas 1, . . . , L respectively. The linear system model is given as follows $$\begin{bmatrix} Y_1(k) \\ \vdots \\ Y_L(k) \end{bmatrix} = \begin{bmatrix} H_1(k) \\ \vdots \\ H_L(k) \end{bmatrix} Z(k) + \begin{bmatrix} N_1(k) \\ \vdots \\ N_L(k) \end{bmatrix}, \text{ or}$$

$$Y(k) = H(k)Z(k) + N(k),$$

where the boldface denotes vector quantities, $N_1(k), \ldots, N_L(k)$ denoted the noise, assumed additive white Gaussian noise (AWGN) on receive paths 1 through L, for tone k.

The received signal is processed by the receive beamformer 547 to generate the estimate denoted $\hat{Z}(k)$ of the transmitted data streams for tone k, with $$\hat{Z}(k) = [W_{R1}(k) \cdots W_{RL}(k)] \begin{bmatrix} Y_1(k) \\ \vdots \\ Y_L(k) \end{bmatrix}, \text{ or}$$

$$\hat{Z}(k) = W_R(k) Y(k)$$

where the receive beamformer weights for tone k are denoted by $W_{R1}(k), \ldots W_{RL}(k)$ for paths 1, . . . , L. In one embodiment, the beamforming step of beamformer 455 is performed for all 52 non-zero tones for every OFDM symbol.

For reception, in one embodiment, antenna combining weighting is given below $$W_R(k) = \left[\hat{H}^{*T}(k)R^{-1}(k)\hat{H}(k)\right]^{-1}\hat{H}^{*T}(k)R^{-1}(k)$$

$$R(k) = \begin{bmatrix} \sigma_1^2(k) & \cdots & \sigma_{1L}^2(k) \\ \vdots & \ddots & \vdots \\ \sigma_{L1}^2(k) & \cdots & \sigma_L^2(k) \end{bmatrix}$$

$$\sigma_{ij}^2(k) = E\{v_i(k)v_j^*(k)\}$$

$$v_i(k) = Y_i(k) - \hat{H}_i(k)\hat{Z}_{Hard}(k)$$

where( )* denotes the complex conjugate, ( )$^T$ denotes the matrix transpose, $\hat{H}$(k) is the L-vector estimate of the receive channel on tone k, and R(k) is the noise and interference covariance matrix for tone k. $\hat{Z}_{Hard}$(k) is the hard decision—the nearest constellation point—of the estimate of the transmitted data stream.

Channel Estimation

In one embodiment, the receive weights, and consequently the transmit weights are calculated using the channel estimates made by channel estimators 449 and 451. In such an embodiment the channel estimation is carried out as described in U.S. patent application Ser. No. 10/217,117 titled CHANNEL ESTIMATION IN A MULTICARRIER RADIO RECEIVER, filed Aug. 12, 2002. U.S. patent application Ser. No. 10/217,117 is incorporated herein by reference. The preamble of each packet conforming to the OFDM variants of the IEEE 802.11 standard includes two symbols—the "long symbols"—that have known tones. Each of channel estimators 449 and 451 receives FFT data for the two long symbols during the long symbol period and computes the channel response, denoted H$_1$(k) and H$_2$(k). The channel estimates are denoted $\hat{H}_1$(k) and $\hat{H}_2$(k) for data received via the first and second antennas 113 and 115. Each estimate is obtained as the average over the two long symbols, and can be expressed as follows $$\hat{H}_1(k) = \frac{Y_1(k,1) + Y_1(k,2)}{2 \cdot LS(k)}$$

$$\hat{H}_2(k) = \frac{Y_2(k,1) + Y_2(k,2)}{2 \cdot LS(k)}$$

where Y$_1$(k,1) is the FFT data from the FFT unit 445 of the digital receive path 425 during the first long training symbol, Y$_1$(k,2) is the FFT data from the FFT unit 445 of the digital receive path 425 during the second long training symbol, Y$_2$(k,1) is the FIT data from the FFT unit 445 of the digital receive path 425 during the first long training symbol, and Y$_2$(k,2) is the FFT data from the FFT unit 445 of the digital receive path 425 during the second long training symbol. LS(k) denotes the known long symbol data at tone k. The channel estimation step is performed for all 52 non-zero tones.

As described in U.S. patent application Ser. No. 10/217,117, the channel determination carried out by each of the channel estimators 449, 451 includes tone smoothing. With tone smoothing, a channel estimate at tone k is averaged with its adjacent neighbors to further reduce the noise in the channel estimate to take into account any correlation between adjacent tone's channel responses. The smoothed channel estimates are denoted as $\tilde{H}_1$(k) and $\tilde{H}_2$(k) for antennas 113 and 115 for tone k. In one embodiment, the smoothing is of each of the closest neighbors, such that $$|\tilde{H}_i(k)| = \frac{\sum_{m=-1}^{1} a_m \cdot |\hat{H}_i(k-m)|}{\sum_{m=-1}^{1} a_m} \quad -25 \le k \le -2, 2 \le k \le 25$$

$$\text{angle}\{\tilde{H}_i(k)\} = \frac{\sum_{m=-1}^{1} a_m \cdot \text{unw\_ang}\{\hat{H}_i(k-m)\}}{\sum_{m=-1}^{1} a_m} \quad -25 \le k \le -2, 2 \le k \le 25$$

$$\tilde{H}_i(k) = \hat{H}_i(k) \quad k = -26, -1, 1, 26$$

Note that in the calculation of angle $\{\tilde{H}_i(k)\}$, that the angles of $\hat{H}_i$(k) must be unwrapped prior to the calculation. This is denoted by the function "unw_ang". The magnitude function is denoted by ||. The tone smoothing weights are denoted by a$_m$. With a frequency selective channel, the weights are set a$_{-1}$,=1, a$_0$=2, and a$_{+1}$=1 so as to not smooth the frequency response as much. The filter length can be fixed at 3-taps. The tap values may be selectable. In order not to delay the decoding of the SIGNAL field, in one embodiment, a non-smoothed channel estimate average is used during the SIGNAL interval.

Note that in one embodiment, the smoothing can be disabled. Furthermore, in one embodiment, the channel estimation includes channel tracking such that the channel estimate is updated as more data is decoded. One embodiment of channel tracking is described in U.S. patent application Ser. No. 10/807,547 to Hart et al, filed Mar. 22, 2004, titled CHANNEL TRACKING IN AN OFDM WIRELESS RECEIVER. U.S. patent application Ser. No. 10/807,547 is incorporated herein be reference. Thus by the end of the reception of the packet, the channel estimates in channel estimators 449, 451 are updated. In one embodiment, the channel tracking method includes obtaining a first estimate of the channel response for each tone, and accepting a pre-decision constellation point value for the tone. The pre-decision constellation point value is channel corrected using the first estimate of the channel response. The channel tracking method further includes making a decision using the pre-decision constellation point value, re-modulating the decision to form a post-decision constellation point value, and forming a complex valued product of the function of the first estimate for the subcarrier and the complex-valued ratio of the pre-decision and post-decision values. This complex valued product forms the channel drift to use for updating the stored channel response. In one embodiment, the method includes updating the stored first estimate of the channel response with a weighted amount of the formed complex valued product. In one embodiment, the first estimate of the channel response is the smoothed channel estimate obtained as described above and in U.S. patent application Ser. No. 10/217,117.

Receive Weights Calculation

Different embodiments of the receiver's weight calculator 455 determine the receive beamformer weights using different methods. One embodiment uses "power combining." Power combining works well under the assumption that the spectral shapes of the noise in the signals received in the two signal paths via the first and second antenna are similar. This assumption is approximated, for example, when the analog and digital filtering across the passband in each antenna's receive path is similar. Power combining works well, furthermore, under the additional assumptions that: 1) the noise power is close in the two antenna paths, for example, if the noise figure of the two antenna signal paths are equal to within a few dB; and 2) the gain of the two antenna signal paths are equal to within a few dB.

The power combining method includes using receive weights, denoted $W_{Rx,1}(k)$ and $W_{Rx,2}(k)$, for each of 52 tones k calculated as follows $$W_{Rx,i}(k) = \frac{\tilde{H}_i^*(k)}{|\tilde{H}_1(k)|^2 + |\tilde{H}_2(k)|^2}$$

$$i = 1, 2$$

These receive beamformer weights are used in the beamformer for every OFDM symbol in the packet: e.g., the SIGNAL field and the following data symbols.

Another receive weight calculation method is maximum ratio combining (MRC). Tone-by-tone MRC works well when the noise in each of the two antenna signal paths is spatially uncorrelated. This would be the case, for example, when there is no co-channel interference. The receive weights $W_{Rx,1}(k)$ and $W_{Rx,2}(k)$ according to MRC are $$W_{Rx,i}(k) = \frac{\frac{\tilde{H}_i^*(k)}{\sigma_i^2(k)}}{\frac{|\tilde{H}_1(k)|^2}{\sigma_1^2(k)} + \frac{|\tilde{H}_2(k)|^2}{\sigma_2^2(k)}}$$

where $\sigma_i^2(k)$≡noise variance estimate on signal path i and tone k i=1,2

This uses an estimate of the noise. In a multipath fading environment, the average power level received on one antenna could be much different than on the other due to flat fading. Independent AGC circuits on each receive antenna branch may cause the perceived average received power level on the two antennas to be equivalent. The primary goal of noise estimation for MRC processing is correct for the AGC. A secondary reason for noise estimation is to account for noise figure differences on the two receive signal paths via the two antennas.

Various methods for noise estimation are possible. One embodiment includes making noise estimates on the data and pilots tones and averaging the initial estimates across the frequency band. In one embodiment, the initial noise estimate on each antenna signal path, denoted $v_1(k)$ and $v_2(k)$ for the first and second signal paths for each tone k is calculated during the two long training symbols as follows $$v_1(k) = \frac{Y_1(k,1) - Y_1(k,2)}{\sqrt{2}}$$

$$v_2(k) = \frac{Y_2(k,1) - Y_2(k,2)}{\sqrt{2}}$$

where $Y_1(k,1)$ and $Y_1(k,2)$ are the FFT data from first digital path 425 during the first long symbol and second long training symbol, respectively, $Y_2(k,1)$ and $Y_2(k,2)$ are the FFT data from second digital path 427 during the first long symbol and second long training symbol, respectively.

The noise power for each tone and antenna signal path is calculated as follows:

$$\sigma_1^2(k) = v_1(k)v_1^*(k)$$

$$\sigma_2^2(k) = v_2^*(k)v_2^*(k)$$

Initially, it is assumed that the noise is flat across the frequency band of the signal. This assumption is based on digital and analog filters being fairly flat across the passband. The noise is then averaged across all frequency tones, as follows $$\sigma_1^2(k) = \frac{1}{52} \sum_{\substack{m=-26 \\ m \neq 0}}^{26} \sigma_1^2(m)$$

$$\sigma_2^2(k) = \frac{1}{52} \sum_{\substack{m=-26 \\ m \neq 0}}^{26} \sigma_2^2(m)$$

In an improved embodiment, to further refine the noise estimates, averaging is performed in time.

For each OFDM symbol, the receive beamformer 457 receives FFT data from the two digital receive paths 425, 427, denoted here by $Y_1(k)$ and $Y_2(k)$, respectively. The output of the beamformer gives the estimate of data stream, depicted by $\hat{Z}(k)$.

$$\hat{Z}(k) = [W_{Rx,1}(k) \quad W_{Rx,2}(k)] \begin{bmatrix} Y_1(k) \\ Y_2(k) \end{bmatrix}$$

All 52 non-zero tones for each receiver signal path are thus received beamformed.

It is known that frequency and clock sampling offset causes the phase channel to change from channel estimate as the packet progresses. According to the current (2004) OFDM variants of the IEEE 802.11 standard, four tones are reserved as pilot tones for phase correction. These tones are number −21, −7, +7, +21 based on a −26 to +26 numbering scheme (with tone 0 being a zero tone). In one embodiment, the beamformed received signals are pilot corrected in the demodulation and decoding unit 459 using the pilot tones.

Transmit Weights Calculation

One aspect of the invention is transmit weight calculation based on the estimated channel responses. Another aspect of the invention is transmit beamforming without requiring the receiving station, e.g., the client 103 to have multiple antennas, and without requiring calibration at the receiving client.

According to the OFDM variants the IEEE 802.11 standard, the receive and transmit frequencies for communicating between two stations, e.g., between client 103 and AP 105 occurs at the same frequencies. Thus, it is reasonable to assume reciprocity applies.

In the following formulae, the dependence on k, the tone, is left out for simplicity. The equations, however, are in the frequency domain and apply to each tone k. Furthermore, the quantities are in general complex valued, as would be clear to those in the art. Thus, a complex valued quantity has an amplitude denoted by || and a phase, denoted by angle( ). Referring again to FIG. 1A, denote by $H_{R_x,i}$, i=1,2 the channel response experienced by the i'th, e.g., the first and second overall receive paths via antenna i, i=1,2, e.g., via the first and second antenna, respectively. The channel estimators 449, 451 respectively obtain an estimate of these channel responses. Each channel response is made up of several components. Denote by $H_{C,Tx}$ the channel response of the transmit signal path of the client station 103. Denote by $H_i$, i=1, 2 the channel response of the wireless link between the transmit antenna 111 of the client station 103 and the i'th antenna, i=1,2, i.e., antenna 113, 115 of the AP 105. Further, denote by $H_{AP,RF,Rx,i}$, i=1, 2 the channel response for each tone of the AP's analog receive signal path via the i'th antenna, i=1,2, and denote by $H_{AP,D,Rx}$, the channel response for each tone of the AP's digital receive signal path for each of the antenna signals. As written, $H_{AP,RF,Rx,i}$, i=1, 2 includes the response of any analog components in the receive signal paths, such that any further processing is carried out in the digital domain. Because all processing, e.g., the filtering carried out in the downconversion is digital, both signal paths through the first and second antennas experience the same digital response $H_{AP,D,Rx}$.

The overall receive channel responses are $$H_{R,1} = H_{C,Tx} \cdot H_1 \cdot H_{AP,RF,Rx,1} \cdot H_{AP,D,Rx}$$

$$H_{R,2} = H_{C,Tx} \cdot H_2 \cdot H_{AP,RF,Rx,2} \cdot H_{AP,D,Rx}$$

Referring now to FIG. 1B, denote by $W_{Tx,1}(k)$ and $W_{Tx,2}(k)$ the transmit beamformer weights used by beamformer 457 (FIGS. 4 and 5) for transmitting from the AP 105 to the client station 103. Denote by $H_{AP,D,Tx}$, the channel response for each tone of the AP's digital transmit signal path for to-be-transmitted the antenna signals, and denote by $H_{AP,RF,Tx,i}$, i=1, 2 the channel response for each tone of the AP's analog transmit signal path via the i'th antenna, i=1,2. As written, $H_{AP,RF,Tx,i}$, i=1, 2 includes the response of any analog components in the transmit signal paths. Because all prior processing is carried out in the digital domain, the signal paths for transmission via the first and second antennas, respectively, experience the same digital response $H_{AP,D,Rx}$. Assuming reciprocity, the signals from each antenna 113, 115 to the client 103's antenna 111 are $H_1$ and $H_2$, respectively. Denote by $H_{C,Rx}$ the receive signal path channel response at the client for each tone. Then the overall receive channel response experienced by a signal received at the client 103, with beamforming, is $$H = W_{Tx,1} \cdot H_{AP,D,Tx} \cdot H_{AP,RFTx,1} \cdot H_{C,Rx} + W_{Tx,2} \cdot H_{AP,D,Tx} \cdot H_{AP,RF,Tx,2} \cdot H_2 \cdot H_{C,Rx}$$

Different embodiments set the transmit weights differently. One embodiment selects the transmit weights to be proportional to the complex conjugate of the estimated channel responses using the noise free-version of MRC, which corresponds to the power combining method. That is $$W_{Tx,i}(k) = \frac{\tilde{H}_i^*(k)}{|\tilde{H}_1(k)|^2 + |\tilde{H}_2(k)|^2}$$

$$i = 1, 2$$

where $\tilde{H}_i(k)$, i=1,2 are the channel estimates based on the most recently received packets from the client station 103.

The inventors found that using such weights can produce a large variation in the antenna outputs. Therefore in another embodiment, a modified noise-free MRC method is used which selects only the phase of the estimated channel response based on the most recently received channel. That is $$\text{angle}(W_{Tx,i}(k)) = -\text{angle}(\tilde{H}_i(k)); \quad |W_{Tx,i}(k)| = 1/2.$$

i.e., $$W_{Tx,i}(k) = \frac{\tilde{H}_i^*(k)}{2|\tilde{H}_i(k)|}$$

$$i = 1, 2$$

Then, substituting the channel contributions for the channel estimates, the overall channel experienced by each tone received at the client is $$H = \frac{H_{R,1}^* \cdot H_{AP,D,Tx} \cdot H_{AP,RF,Tx,1} \cdot H_1 \cdot H_{C,Rx}}{2|H_{R,1}|} + \frac{H_{R,2}^* \cdot H_{AP,D,Tx} \cdot H_{AP,RF,Tx,2} \cdot H_2 \cdot H_{C,Rx}}{2|H_{R,2}|}$$

This may be re-written as $$H = \frac{1}{2}(H_{AP,D,Tx} \cdot H_{AP,RF,Tx,1} \cdot H_{C,Rx}) \cdot \left( \frac{H_{C,Tx}^*}{|H_{C,Tx}|} \cdot \frac{H_{AP,D,Rx}^*}{|H_{AP,D,Rx}|} \cdot \frac{H_{AP,RF,Rx,1}^*}{|H_{AP,RF,Rx,1}|} \right)$$

$$\left[ |H_1| + \frac{H_{AP,RF,Tx,2} \cdot \frac{H_{AP,RF,Rx,2}^*}{|H_{AP,RF,Rx,2}|}}{H_{AP,RF,Tx,1} \cdot \frac{H_{AP,RF,Rx,1}^*}{|H_{AP,RF,Rx,1}|}} \cdot |H_2| \right]$$

FIG. 6 shows the above formula and the three major contributors. The first contribution 601 is $$(H_{AP,D,Tx} \cdot H_{AP,RF,Tx,1} \cdot H_{C,Rx})$$

The terms here include any transmit digital filtering and transmit RF filtering in the AP 105, and any receive digital filtering and receive RF filtering in the client 103. The effects, however, are similar to the case of a single antenna system in the AP. Note that the magnitudes of any receive digital filtering and receive RF filtering in the AP 105, and any transmit digital filtering and transmit RF filtering in the client 103 do not contribute to this term.

The second term 602 is a phase term that includes the angles of three transfer functions, and contributes the following angle to overall phase -angle($H_{C,Tx}$)-angle($H_{AP,D,Rx}$)-angle($H_{AP,RF,Rx,1}$).

Thus, the phase of any receive digital filtering and receive RF filtering in the AP 105, and any transmit digital filtering and transmit RF filtering the client 103 do have an effect compared to using a single antenna on transmit from the AP.

The third term includes the factor 603 and is $$\left[ |H_1| + \frac{H_{AP,RF,Tx,2} \cdot \frac{H_{AP,RF,Rx,2}^*}{|H_{AP,RF,Rx,2}|}}{H_{AP,RF,Tx,1} \cdot \frac{H_{AP,RF,Rx,1}^*}{|H_{AP,RF,Rx,1}|}} \cdot |H_2| \right].$$

Is it desired that the real part of term 603, namely $$\frac{H_{AP,RF,Tx,2} \cdot \frac{H^*_{AP,RF,Rx,2}}{|H_{AP,RF,Rx,2}|}}{H_{AP,RF,Tx,1} \cdot \frac{H^*_{AP,RF,Rx,1}}{|H_{AP,RF,Rx,1}|}}$$

is positive and relatively large with respect to the imaginary part of term 603, such that there is a positive contribution in the beamforming. The worse case is that $$\frac{H_{AP,RF,Tx,2} \cdot \frac{H^*_{AP,RF,Rx,2}}{|H_{AP,RF,Rx,2}|}}{H_{AP,RF,Tx,1} \cdot \frac{H^*_{AP,RF,Rx,1}}{|H_{AP,RF,Rx,1}|}} = -1,$$

such that there is perfect cancellation of the signals.

Equal gain combining, which is only slightly inferior to MRC, is when this term 603 is +1, i.e., $$\frac{H_{AP,RF,Tx,2} \cdot \frac{H^*_{AP,RF,Rx,2}}{|H_{AP,RF,Rx,2}|}}{H_{AP,RF,Tx,1} \cdot \frac{H^*_{AP,RF,Rx,1}}{|H_{AP,RF,Rx,1}|}} = 1,$$

such that the factor is $(|H_1(k)|+|H_2(k)|)$.

One aspect of the invention is the matching of the magnitude and phase of the transmit RF signal paths via each antenna in the AP, such that $$H_{AP,RF,Tx,1} = H_{AP,RF,Tx,2}.$$

Another aspect of the invention is the matching of the phase of the receive RF signal paths via each antenna in the AP, such that angle($H_{AP,RF,Rx,1}(k)$)=angle($H_{AP,RF,Rx,2}(k)$) for all tones $k$.

Note that the client hardware has no effect on the third term.

One embodiment of the AP transceiver uses a superheterodyne architecture. The transceiver is a single chip other than the intermediate frequency filters that are external SAW devices. For such an architecture, in order to keep gain variations relatively low, one embodiment uses high quality IF filters in the RF paths of the AP.

One embodiment of the access point is preferably constructed on a single printed circuit board (PCB). The RF transceivers 117, 119 and modems 421, 423 are each implemented with CMOS technology in individual integrated circuits (chips). The printed circuit boards are constructed such that the receive and transmit signal paths to each antenna are matched, e.g. by ensuring the same length of the etched signal traces, and the same neighboring signal traces. In one embodiment, the RF transceivers use a superheterodyne architecture with external IF filers. In such an embodiment, the external transmit filters are matched. Furthermore, the external receive filters also are matched, at least in phase.

In an alternate embodiment, the elements such as the IF filers may or may not be initially matched, but are provided along with a calibration and correction procedure the effectively matches these components. For instance, one embodiment includes at manufacture time, measured and recorded open loop calibration information e.g., as at least one table. The at least one table provides different calibration values for different transit powers, different receive gains, different band and/or frequency channels, or different temperature. Another embodiment includes a provision for closed loop (in-service) calibration. Any signals for transmission are separately adjusted by these calibration values.

Thus, the matching may be carried out by configuration at manufacture, or after manufacture.

By so processing the signal, the transmitted signals are steered towards the receiving client 103, and furthermore, the transmitted signals are pre-equalized such that the client 103 has an easier receive signal to process than if no pre-equalizing occurred.

In one embodiment, the weight calculating and other processing is carried out by a programmable processor.

Note that while the description herein is for implementation in an AP for communication with a client of the AP, the method is more general for implementation in a first wireless station for communication with a second wireless station, the first station having a plurality of antennas and a corresponding plurality of receive signal paths and transmit signals paths, one transmit and one receive signal path per antenna. In one exemplary arrangement, the first station is a client station, and the second station is an AP.

While the description herein is for the first station having two antennas and two each of a corresponding receive signal path and transmit signal path, the invention is not restricted to two antennas, and may be generalized to a station with more than two antennas for receiving and transmitting.

It should be appreciated that although the invention has been described in the context of the OFDM variants of the IEEE 802.11 standard, the invention is not limited to such contexts and may be utilized in various other systems that use OFDM for receiving packet data. OFDM is one example of a multicarrier system in which the signal for transmission is split into a set of subcarriers. The invention may also be applicable to other wireless receivers that use multicarriers.

While an embodiment has been described for operation in an OFDM receiver with RF frequencies in the 2 GHz range (802.11g) and 5 GHz range (802.11a), the invention may be embodied in receivers and transceivers operating in other RF frequency ranges.

The IEEE 802.11a and 802.11g standards use OFDM and a preamble with two identical known long symbols that provide for channel estimation. The invention may be used with any data that includes known transmitted symbols or transmitted signals that may be accurately determined at the receiver. For example, the invention may include any number of known symbols at known locations. The symbols need not be identical. Furthermore, the symbols may be known because of the packet structure, or may become known via decision-direction and/or decoded-decision direction.

One embodiment of each of the methods described herein is in the form of a computer program that executes on a processing system, e.g., one or more processors that are part of an OFDM wireless receiver. The receive and transmit digital signal paths in one embodiment include a processor, and for example, the weight calculator 455 is in one embodiment a processing system. Thus, memory 475 includes the memory of the processor.

Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM, or in the form of carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate technique for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, some of the embodiments are described herein as a method or combination of elements of a method that can be implemented by a processor of a computer system or by other means of carrying out the function. Thus, a processor with the necessary instructions for carrying out such a method or element of a method forms one example of a means for carrying out the method or element of the method. Furthermore, an element described herein of an apparatus embodiment is one example of a means for carrying out the function performed by the element for the purpose of carrying out the invention.

All publications, patents, and patent applications cited herein are hereby incorporated by reference.

In the claims below and the description herein, the term "comprising" or "comprised of" or "which comprises" is an "open" term that means including at least the elements/features that follow, but not excluding others. The term "including" or "which includes" or "that includes" as used herein is also an "open" term that also means including at least the elements/features that follow the term, but not excluding others. Thus, including is synonymous with and means comprising.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention. Furthermore, the words comprising and comprise are meant in the sense of "including" and "include" so describe including at least the elements or steps described, and provide for additional elements or steps.

We claim:

1. A method at a first wireless station of transmitting to another wireless station, the method comprising:

determining, for each of a plurality of antennas included in the first station, a corresponding measure of the EVM for signals received from a second station via said each antenna, the antennas coupled to at least one receive signal path for receiving and to a transmit signal path for transmitting, wherein the first wireless station is operative to communicate with a plurality of wireless stations including the second wireless station, the first and each of the plurality of wireless stations being for communicating packets of information using OFDM signals that include a plurality of frequency tones;

determining, using at least the corresponding measures of the EVM for each of the antennas, a decision for selecting one or more of the antennas for communicating with the second wireless station, wherein determining includes a combination of maximum ratio combining on a tone-by-tone weighted basis and selecting a subset of antennas by setting corresponding antenna weights to respective ones or zeros;

storing the EVMs or the determined decision based thereon in a memory included in the first station;

repeating the determining of measures of the EVMs for each of the antennas while receiving from one or more of the plurality of wireless stations, for each wireless station for which the measures of the EVMs are determined, repeating the steps of determining a decision for communicating with the wireless station, and of storing, for the wireless station, the EVMs or the decision determined therefrom in the memory, such that after some time, the memory includes the EVMs or the decisions for communicating with wireless stations, including the second wireless station, with which the first wireless station recently communicated;

retrieving from the memory the stored EVMs or decision determined therefrom for communicating with the second wireless station, and selecting, according to the retrieved EVMs or decision, an antenna for transmitting to the second wireless station; and transmitting signals for transmission via the selected antenna and the transmit signal path, such that the second station can receive packets transmitted from the first wireless station without the second station requiring a plurality of receive antennas and without any first-station-specific calibration required at the second station.

2. A method as recited in claim 1, wherein the number of antennas is two.

3. A method as recited in claim 1, wherein the packets substantially conform to one of the OFDM variants of the IEEE 802.11 standard or derivatives thereof, wherein each packet includes a pre-defined part, and wherein the determining of the measures of the EVM via each antenna occurs during receiving at the first station of signals corresponding to the pre-defined part of a packet transmitted from the second station.

4. A method as recited in claim 3, wherein the first station is an access point.

5. A method as recited in claim 3, wherein the first station is a client station.

6. A method as recited in claim 3, wherein the first station includes a receive antenna selector coupled to each of the antennas, and wherein the determining of the measure of the EVM includes sequentially switching between each of the antennas during receiving of pre-defined part to determine the measure of the EVM for the signals received from the second station via each of the antennas.

7. A method as recited in claim 6, wherein the sequentially switching between each of the antennas during receiving is prior to conducting automatic gain control at the first station.

8. A method as recited in claim 3, wherein the first station includes a receive signal path coupled to each antenna, and wherein the determining of the measure of the EVM includes determining the measure of the EVM for the signals received from the second station via each of the receive signal paths corresponding to each of the antennas.

9. A method as recited in claim 3, wherein the pre-defined part is a modulated signal field having a pre-defined modulation.

10. A method as recited in claim 3, wherein the pre-defined part is a preamble having at least one long symbol having known tones.

11. An apparatus in a first wireless station, the apparatus comprising:

a plurality of antennas for communicating with any of a plurality of wireless stations, including a second wireless station, the first and plurality of wireless stations for communicating packets of information using OFDM signals that include a plurality of frequency tones, the plurality of antennas for receiving and transmitting coupled to at least one receive signal path for receiving and to a transmit signal path for transmitting;

means for determining, for each of the antennas of the first wireless station, corresponding measures of the EVM for signals received from any one of the plurality of wireless stations;

means for determining a decision, using the determined measures of the EVMs corresponding to the wireless station, the decision being for selecting one or more of the transmit antennas for transmitting to the wireless station, wherein determining includes a combination of maximum ratio combining on a tone-by-tone weighted basis and selecting a subset of antennas by setting corresponding antenna weights to respective ones or zeros;

storage means for storing the EVMs or the determined decision based thereon, such that after some time, the storage means includes the EVMs or the decisions for communicating with wireless stations, including the second wireless station, with which the first wireless station recently communicated;

selection means for retrieving from the memory the stored EVMs or decision determined therefrom for communicating with the second wireless station, and for selecting, according to the retrieved EVMs or decision, an antenna for transmitting to the second wireless station; and means for transmitting to the second station signals for transmission via the selected antenna for the transmit signal path, such that the second station can receive packets transmitted from the first wireless station without the second station requiring a plurality of receive antennas and without any first-station-specific calibration required at the second station.

12. An apparatus as recited in claim 11, wherein the number of antennas is two.

13. An apparatus as recited in claim 11, wherein the packets substantially conform to one of the OFDM variants of the IEEE 802.11 standard or derivatives thereof, wherein each packet includes a pre-defined part, and wherein the means for determining of the measures of the EVM via each antenna is configured to determine the measure of the EVM corresponding to the pre-defined part of a packet transmitted from the wireless station.

14. An apparatus as recited in claim 13, wherein the first station is an access point.

15. An apparatus as recited in claim 13, wherein the first station is a client station.

16. An apparatus as recited in claim 13, further comprising:
means for selecting a receive antenna, the receive antenna selecting means coupled to each of the antennas, and wherein the means for determining the measure of the EVM is configured to sequentially switch between each of the antennas to determine the measure of the EVM during receiving of the pre-defined part from the wireless station via each of the antennas of the first wireless station.

17. An apparatus as recited in 16, wherein the determining of the EVMs and the means for selecting a receive antenna are configured such that the EVM is determined prior to conducting automatic gain control at the first station.

18. An apparatus as recited in claim 13, further comprising:
a plurality of receive signal paths, each receive signal path coupled a different one of the antennas,
wherein the means for determining the measure of the EVM includes means for determining the measure of the EVM for the signals received from the wireless station via each of the receive signal paths corresponding to each of the antennas.

19. An apparatus as recited in claim 13, wherein the pre-defined part is a modulated signal field having a pre-defined modulation.

20. An apparatus as recited in claim 13, wherein the pre-defined part is a preamble having at least one long symbol having known tones.

21. An apparatus comprising:
a plurality of antennas for receiving and transmitting, the antennas in a first wireless station for communicating with a plurality of wireless stations including a second wireless station, the first and plurality wireless stations for communicating packets of information using OFDM signals that include a plurality of frequency tones, the plurality of antennas coupled to at least one receive signal path for receiving and to a one transmit signal path for transmitting;
each of the at least one receive signal path comprising:
a radio receiver coupled to the antenna of the receive signal path;
an analog-to-digital converter coupled to the radio receiver to produce a received signal for the antenna of the receive signal path; and
an EVM calculator coupled to the analog-to-digital converter, the EVM calculator configured to determine corresponding measures of the EVM of signals received from any one of the wireless stations via each of the antennas of the first station, and further configured to generate a decision, using the determined measures of the EVMs corresponding to the wireless station, the decision being for selecting one or more of the transmit antennas for transmitting to the wireless station, wherein determining includes a combination of maximum ratio combining on a tone-by-tone weighted basis and selecting a subset of antennas by setting corresponding antenna weights to respective ones or zeros;
a memory coupled to the EVM calculator and operative to store the EVMs or the determined decision based thereon, such that after some time, the memory includes the EVMs or the decisions for communicating with a set of wireless stations, including the second wireless station, with which the first wireless station recently communicated;
an antenna selector coupled to the memory and to the transmit signal path and operative to retrieve the stored EVMs or decision determined therefrom for communicating with any one of the set of wireless stations, and further operative to select one transmit antenna for transmitting to the one wireless station of the set; and
a radio transmitter accepting a signal for transmitting and coupled to the antenna selector, the radio transmitter configured to transmit via the antenna selected by the selector,
such that the second station can receive packets transmitted from the first wireless station without the second station requiring a plurality of receive antennas and without any first-station-specific calibration required at the second station.

22. An apparatus as recited in claim 21, wherein the number of antennas is two.

23. An apparatus as recited in claim 21, wherein the packets substantially conform to one of the OFDM variants of the IEEE 802.11 standard or derivatives thereof, wherein each packet includes a pre-defined part, and wherein the EVM calculator is configured to determine the measures of the EVM during receiving at the first station of signals corresponding to the pre-defined part of a packet transmitted from the wireless station.

24. An apparatus as recited in claim 23, wherein the first station is an access point.

25. An apparatus as recited in claim 23, wherein the first station is a client station.

26. An apparatus as recited in claim 23, wherein the EVM calculator and selector further are configured to sequentially switch between each of the antennas during receiving of the pre-defined part to determine the measure of the EVM for the signals received from the wireless station via each of the antennas.

27. An apparatus as recited in claim 26, wherein the EVM calculator further is configured to determine a measure of the EVM prior to automatic gain control at the first station.

28. An apparatus as recited in claim 23, further comprising:
a plurality of receive signal paths, each receive signal path coupled a different one of the antennas,
wherein the EVM calculator is configured to determine the measure of the EVM for the signals received from the wireless station via each of the receive signal paths corresponding to each of the antennas.

29. An apparatus as recited in claim 23, wherein the pre-defined part is a modulated signal field having a pre-defined modulation.

30. An apparatus as recited in claim 23, wherein the pre-defined part is a preamble having at least one long symbol having known tones.

31. An apparatus comprising:
a plurality of antennas for receiving and transmitting, the antennas in a first wireless station for communicating with any of a plurality of wireless stations, including a second wireless station, the first and the plurality of wireless stations for communicating packets of information using OFDM signals that include a plurality of frequency tones, the plurality of antennas coupled to at least one receive signal path for receiving and to a transmit signal path for transmitting;
each of the at least one receive signal path comprising:
a radio receiver coupled to the antenna of the receive signal path;
an analog-to-digital converter coupled to the radio receiver to produce a received signal for the antenna of the receive signal path;
the transmit signal path comprising:
an antenna selector coupled to the antennas; and
a radio transmitter for transmitting coupled to the antenna selector for transmitting a signal, the radio transmitter configured to transmit via the antenna selected by the selector,
the apparatus further comprising:
a processing system comprising a computer readable storage medium containing computer readable code segments that when executed by one or more processors of the processing system cause:
determining corresponding measures of the EVM of signals received from the any one of the wireless stations via each of the antennas of the first station using the received signals from the analog-to-digital converter;
generating a decision, using the determined measures of the EVMs corresponding to the wireless station, the decision being for selecting one or more of the transmit antennas for transmitting to the wireless station, wherein determining includes a combination of maximum ratio combining on a tone-by-tone weighted basis and selecting a subset of antennas by setting corresponding antenna weights to respective ones or zeros;
storing the EVMs or the determined decision based thereon in the storage medium, such that after some time, the storage medium includes the EVMs or the decisions for communicating with a set of wireless stations, including the second wireless station, with which the first wireless station recently communicated;

retrieving the stored EVMs or decision determined therefrom for communicating with the second wireless stations; and causing the antenna selector to select the antenna for transmitting to the second wireless station, such that the second wireless station can receive packets transmitted from the first wireless station without the second station requiring a plurality of receive antennas and without any first-station-specific calibration required at the second station.

32. An apparatus as recited in claim 31, wherein the number of antennas is two.

33. An apparatus as recited in claim 31, wherein the packets substantially conform to one of the OFDM variants of the IEEE 802.11 standard or derivatives thereof, wherein each packet includes a pre-defined part, and wherein the determining of the measures of the EVM via each antenna determines the measure of the EVM corresponding to the pre-defined part of a packet transmitted from the second station.

34. An apparatus as recited in claim 33, wherein the at least one receive path includes a receive signal path coupled to each antenna, and wherein the determining of the measure of the EVM includes determining the measure of the EVM for the signals received from the second station via each of the receive signal paths corresponding to each of the antennas.

35. An apparatus as recited in claim 33, further comprising a receive antenna selector coupled to each of the antennas, wherein the determining of the measure of the EVM includes sequentially switching between each of the antennas during receiving of the preamble part to determine the measure of the EVM for the signals received from the second station via each of the antennas.

36. An apparatus as recited in claim 33, wherein the pre-defined part is a modulated signal field having a pre-defined modulation.

37. An apparatus as recited in claim 33, wherein the pre-defined part is a preamble having at least one long symbol having known tones.

* * * * *